United States Patent
Shelp et al.

(10) Patent No.: US 6,866,754 B2
(45) Date of Patent: Mar. 15, 2005

(54) ELECTROCHEMICAL COVER FOR INHIBITING DIFFUSION/INFILTRATION OF OXYGEN INTO REACTIVE SULPHIDE MATERIALS

(75) Inventors: Gene Sidney Shelp, Guelph (CA); Rejean Joseph Henri Brousseau, Orleans (CA)

(73) Assignee: Enpar Technologies Inc., Guelph (CA)

( * ) Notice: Subject to any disclaimer, the term of this patent is extended or adjusted under 35 U.S.C. 154(b) by 224 days.

(21) Appl. No.: 10/147,458

(22) Filed: May 17, 2002

(65) Prior Publication Data

US 2002/0189935 A1 Dec. 19, 2002

Related U.S. Application Data

(63) Continuation-in-part of application No. PCT/CA00/01385, filed on Nov. 24, 2000.

(30) Foreign Application Priority Data

Nov. 24, 1999 (GB) .............................. 9927716

(51) Int. Cl.⁷ .............................. C25F 7/00; C02F 1/70; C23F 13/10
(52) U.S. Cl. ................. 204/242; 204/263; 204/284
(58) Field of Search ................. 204/242, 263, 204/284; 205/742, 753, 754, 758

(56) References Cited

U.S. PATENT DOCUMENTS

| | | | |
|---|---|---|---|
| 3,823,081 A | 7/1974 | Treharne et al. | 204/151 |
| 4,072,798 A | 2/1978 | Sisler et al. | 429/2 |
| 4,561,948 A | 12/1985 | Stiller | 204/129 |
| 4,678,554 A | 7/1987 | Oppitz | 204/229 R |
| 4,990,031 A | 2/1991 | Blowes et al. | 405/263 |
| 5,630,934 A | 5/1997 | Chesworth et al. | 205/742 |
| 6,309,533 B1 | 10/2001 | Shelp et al. | 205/742 |

FOREIGN PATENT DOCUMENTS

| | | | |
|---|---|---|---|
| DE | 197 24 137 A1 | 12/1998 | C02F/1/46 |
| DE | 297 24 320 U1 | 9/2000 | C02F/1/46 |
| GB | 2 202 862 | 10/1988 | C02F/1/46 |
| GB | 2 285 441 | 7/1995 | C23F/13/06 |
| RU | 1556589 | 4/1990 | A01G/25/00 |
| WO | WO 93/24412 A1 * | 12/1993 | C02F/1/20 |
| WO | WO95/29129 | 11/1995 | C02F/1/70 |
| WO | WO98/42457 | 10/1998 | B09B/1/100 |

* cited by examiner

Primary Examiner—Roy King
Assistant Examiner—Harry D. Wilkins, III
(74) Attorney, Agent, or Firm—Anthony Asquith & Co.

(57) ABSTRACT

Acidity in water leaching from a mass of sulphide tailings is prevented by de-oxygenating the water prior to entering the mass. A cover comprising an electrolytic cell, either galvanic or impressed-current, gives rise to a cathode reaction in which the redox voltage of the water drops to 003 volts or less. The cover can be thinner, and much less expensive, than an equally-effective non-reactive cover. The electrolyte is water contained in water-retaining soil, or a depth of water, lying over the cathode. The cathode is steel mesh, or a layer of graphite, spread over the whole mass of tailings.

22 Claims, 5 Drawing Sheets

ELECTROCHEMICAL COVER FOR INHIBITING DIFFUSION/INFILTRATION OF OXYGEN INTO REACTIVE SULPHIDE MATERIALS

This is a Continuation-in-Part of International Patent Appln number PCT/CA-00/01385 filed Nov. 24, 2000, and published May 31, 2001 as WO-01/38233, under PCT Art.21(2), in English.

When water passes through sulphide material, such as a mass of tailings left over from an ore-crushing operation at a mine, oxygen in the mass and in the water can cause the water to pick up acidity. An aim of the invention is to prevent or inhibit the acid-producing reactions that lead to acid mine drainage or acid rock drainage (AMD/ARD).

BACKGROUND TO THE INVENTION

AMD results when sulphide minerals are exposed to oxygen, water and aerobic bacteria. The sulphide minerals with which the invention is concerned include pyrite or marcasite $FeS_2$, pyrrhotite FeS, chalcopyrite $FeCuS_2$, bornite $Cu_5FeS_4$, sphalerite ZnS, arsenopyrite FeAsS, millerite NiS, pentlandite $(FeNi)_9S_8$, galena PbS, molybdenite $MoS_2$, and other metal sulphide minerals which oxidize when exposed to oxygen, water, and aerobic bacteria.

At many mines, oxygenated precipitation water and oxygenated ground water pass through mine tailings, and mining waste, containing one or more of these sulphide minerals. At other locations, a mass or seam of acidity-causing sulphide minerals may have become exposed (as a result of workings, or even naturally) to the passage of oxygenated water therethrough. The exposed sulphide minerals can become oxidised, whereby water draining from these exposed bodies can comprise AMD or ARD, or an acidic metal-rich leachate, which is inimical to receiving aquatic environments.

Pyrite $FeS_2$, for example, readily oxidizes in the presence of oxygen (air), water and bacteria in a complex manner according to a series of reactions which, in total, may be summarized in terms of the following simplified stoichiometric relationship:

$$2\,FeS_2 + 7.5\,O_2 + 7\,H_2O \xrightleftharpoons{\text{(bacteria)}} 2\,Fe(OH)_3 + 4\,H_2SO_4$$

The resulting leachate is acidic, as indicated by the presence of sulphuric acid in the equation.

The iron in the pyrite changes from a reduced state (e.g. $Fe^{++}$) to an oxidized state (e.g. $Fe^{+++}$) in the hydroxide, and this change is in itself acid-producing; and by a feedback mechanism this change causes further oxidation and therefore further acidity.

These types of reactions are not confined only to iron. Where the mineral includes a metal other than iron, similar reactions which change the metal to a more oxidized state similarly produce further acidity.

The pH in the leachate waters which can be attributed to these mechanisms can be 3 or even lower in a typical real case. The acidity level that results from the oxidation of sulphide minerals is in most situations hazardous to local aquatic ecosystems.

Such acidity can develop wherever oxygenated moist conditions occur within materials composed of pyrite and other sulphide minerals. The acidity does tend to disperse eventually, as natural bases dissolve in the acid and by dilution as metals and other substances dissolve in the acid. However, this could take centuries, and relying on natural dispersion is unacceptable in most mine situations.

One approach to the problem of AMD and ARD has been to treat acid pond water (i.e water that has leached through an exposed body of pyrite or other mineral, and has collected in a pond) with continual additions of bases such as lime, $Ca(OH)_2$. However, such treatment systems in general require a high degree of maintenance, which sometimes must be continued for many decades. And, no matter how effective that treatment system might be, in treating the acidic pond water, the water entering the pond will still be acidic, and the treatment will have to be continued. The cause of the acidity in the pond is the fact that the water entering the pond has passed through exposed pyrite, or other acid-producing mineral.

It is of course well-known that sulphide minerals lose their ability to cause acidity if the minerals are kept from becoming exposed to oxygen. Thus, sulphide minerals lying at the bottom of a lake, for example, can be harmless. Water at the bottom of a deep lake is normally devoid of oxygen, so that no acid producing reaction takes place. Sealing the acid-generating minerals by placing them at the bottom of a deep lake has been one approach to the problem of preventing the acidity-producing reactions from taking place.

As a way of preventing the acidity-producing reactions from taking place, one approach has been to seal the acid-generating minerals (pyrite or other) from exposure to atmospheric oxygen. This can be done, for example, though at great expense, by building a dam and flooding the exposed seam of pyrite. At even greater expense, the exposed portions of the acid-producing mineral can be excavated from the ground, and dumped in a deep lake (with unknown environmental consequences). Another approach has been to construct engineered covers that inhibit the diffusion of oxygen and/or the infiltration of oxygenated water. These techniques are extremely expensive and not always effective.

An aim of the invention is to shield a body of sulphide mineral from oxidation, or at least from oxidation at such a level as might lead to dangerous levels of acidity in leachate water. The invention basically involves providing an electrolytic cell, which de-oxygenates water passing therethrough, and involves positioning the cell in such a manner that the water entering the mass of sulphide mineral is the de-oxygenated water from the cell.

The principle of the electrolytic cell is known, in which two conductors are placed in an acidic electrolyte, the two conductors having different standings in the electrochemical series; if a circuit is established between the two, under the right conditions a current will start to flow.

Free electrons become available at the electrodes, and reduce elemental oxygen to hydroxyl ions resulting in the production of alkalinity; in the absence of oxygen, hydrogen ions in the electrolyte reduce to hydrogen gas, which bubbles away. As a result, the pH at the cathode is raised.

When this system is constructed as a cover, placed over acidity-generating sulphide materials, much of the oxygen is removed from infiltrating oxygenated rainwater, and much of the oxygen diffusing through the cover is removed. The system can be operated as a galvanic system, using a sacrificial anode. Or the system can operate as an impressed-current system, which utilizes an external power source such as municipal AC power, or a DC solar cell, or a wind-powered generator.

It is an aim of the invention to utilize the principles of both the galvanic cell and the impressed current cell to form an electrochemical cover over acid-generating sulphide materials for the purpose of preventing the natural acidity-producing reactions from taking place.

It is an aim of the invention that the production of AMD/ARD be prevented, or at least be reduced to insignificance. It is an aim of the invention that the seepage water emerging through the underlying sulphide rich material should contain only an acceptably low concentration of acidity.

It is also an aim of the invention to provide a treatment system which can be left to operate by itself, with little or no maintenance. It happens sometimes that mine workings are not just closed, but are totally abandoned, with no resources (including no external power source) left for such things as cleaning up acidity. It is an aim of the invention to provide a treatment system which can be put in place economically in a mine in which such total abandonment is contemplated, or has occurred, being a treatment system which can be expected to keep acidity effectively under control indefinitely, with minimum or zero maintenance.

GENERAL FEATURES OF THE INVENTION

In its preferred form, the invention provides an electrochemical cell, which is arranged to lie over the mass of sulphide. Water passing through the cell undergoes reactions which lead to de-oxygenation, and to a raising of the pH.

The cathode of the cell is positioned so as to intercept water infiltrating into the sulphide mass, and the water passes through the cathode, whereby preferably all water that enters the sulphide mass is water that has just passed close to the negative charge on the cathode electrode.

The extent of the de-oxygenation of the water may be measured by measuring the redox voltage, or Eh-voltage, of the water. It is recognised that the level of de-oxygenation is effective to cause acidity to drop to insignificant levels if the Eh-voltage is 0.3 volts, or less.

The designer of the system should see to it that the cell is physically positioned, in relation to the sulphide mass, so as to ensure that the water, having been de-oxygenated, does not have an opportunity to become re-oxygenated, prior to entering the sulphide mass.

Preferably, the cell is formed as a physical cover for the mass of sulphide, whereby the material of the cell acts to keep rainwater and atmospheric oxygen from entering directly into the sulphide. Preferably the anode is placed in the electrolyte of the cell above the cathode, whereby water passing through the cell, and infiltrating into the sulphide, passes through the cathode last. Thus, whatever physical exclusion of oxygen is provided by the cover, preferably the effect of the exclusion should be greatest at the location of the cathode. Preferably, the cover should be at least 30 cm thick over the cathode.

In one preferred form, the electrolyte of the cell is water contained in, and infiltrating through, a body of water-retaining material. This material preferably is a material that retains water, and prevents water from draining out, by capillary action. The material may be clay, silt, till, sand, gravel, etc. Or, the material may be organic, e.g wood waste, wood chips, peat, animal waste (manure), municipal waste, etc. The material may comprise a mixture of two or more of these materials. The anode and the cathode are embedded in the material, whereby the water in the material maintains electrolytic continuity between the anode and the cathode.

In another form, no water-retaining material is provided, and the cover comprises simply a depth of water. Again, preferably, the cathode should be located under at least 30 cm of water. It is arranged that both the anode and the cathode are immersed in the water of the cover, whereby the water of the cover comprises the electrolyte of the cell.

The cell may be galvanic, in which case the anode should be made from a sacrificial metal, such as magnesium. Other metals that may be suitable as sacrificial anodes include iron and aluminum.

Alternatively, the cell may be operated by electricity impressed onto the cell from an outside source, in which case the electrodes may be made of inert materials such as ceramics, metal alloys, metal silicate, and metal oxide materials. When the cell is operated by outside electricity, an automatic control system may be provided, in which the energy supplied is adjusted in response to changes in the Eh-voltage of the water passing through the cathode.

In a preferred form, the cathode comprises rods, or a mesh, of a metal such as steel. The water passes through the holes in the mesh, and the mesh should be tight enough that water passes closely enough to the metal of the cathode for the water to be affected by the charge on the cathode. This distance may be as little as 2 cm, depending on the water-retention characteristics of the material of the electrolyte layer.

In another preferred form, the material of the cathode is a layer of granular electrically-conductive material, such as graphite. As water infiltrates through the graphite, the water is intimately affected by the cathode reactions. The graphite layer preferably is 5 cm thick or more.

The invention is aimed at creating an effective electrochemical barrier for preventing the infiltration and diffusion of oxygen into an underlying mass of sulphide. The invention may be applicable where there exists a bedrock seam of sulphide minerals, or a mass of sulphide-rich waste materials, in such a position that oxygenated water may pass through, or oxygen gas may diffuse into, the said mass. The invention may be applicable whether the mass of sulphide is above or below the water table.

Electrical contact is established between the cathode material and the anode by an electrical cable. The circuit is completed via the electrical continuity of the electrolyte. In the external circuit, charge is transferred by electrons; and in the internal circuit, charge is transferred by ions. In the electrolyte, ions of substances dissolved in the pore water contained within the electrolyte material can physically travel between anode and cathode.

It is recognized in the invention that the anode need not necessarily be placed within the electrolyte overlying the waste material. The requirement is for the anode to be in effective operational electrical contact with the cathode and this requirement can be achieved by placing the anode within the electrolyte (soil, till, clay, silt, sand, organic material or water) either underlying the waste material or surrounding the waste material or placing the anode into the underlying sulphide.

When the anode is placed within the waste material or within the underlying or surrounding electrolyte, the cathode should be placed within the existing overburden, or within the oxidized portion of the waste material, or within the un-oxidized waste material, in such a way to ensure electrical continuity. It is not necessary for the electrolyte to be saturated as sufficient electrical continuity can be provided by materials at a moisture content equal to field capacity.

The predominant reaction that reduces the oxygen infiltrating and diffusing into the sulphide, and thereby inhibits the oxidation of the sulphide-rich materials, occurs at the cathode. Oxygen is reduced to form alkalinity by the following reaction:

$$O2+2H2O+4e- \rightarrow 4OH-$$

The amount of oxygen arriving at the cathode will be directly related to the type of electrolyte material (clay, till, silt, sand, and water) and the associated thickness of the said material. The amount of oxygen appearing at the cathode decreases with the type of material in the electrolyte layer in the following order: water, clay, till, silt and sand. The system is self regulating, in that current is a function of the concentration of oxygen at the cathode. Furthermore, the resistivity of the electrolyte decreases with material in the same order. Consequently, the more oxygen that is present in the water entering the cathode, the more vigorous the electrolytic action of cell to remove that oxygen. The resulting power demand is in turn related to electrolyte material.

THE INVENTION IN RELATION TO THE PRIOR ART

In U.S. Pat. No. 5,630,934 (Chesworth et.al., 1997), both the galvanic cell and the impressed-current cell are utilized to prevent the acidity generating reactions associated with sulphide waste materials in situ. In that case, however, the system was designed such that the sulphide minerals form the cathode of the electrochemical cell and the electrolyte consists of the porewater within the contaminated material. The present invention preferably comprises an electrochemical cover which is placed over the contaminated material. The cover may comprise a cathode constructed of metal mesh, metal rods or other conductive materials such as graphite and carbon and an electrolyte comprising the water in moisture-containing materials such as clay, silt, till, sand, gravel, etc.

The efficacy of the electrochemical cover does not depend on the mineralogical characteristics of the sulphide material, in that the system intercepts and removes oxygen before the oxygen can enter into the sulphide material. The main reaction is the reduction of oxygen to produce alkalinity. The reduction of oxygen is a cathodic reaction which occurs as oxygenated water (rainwater or groundwater) and air migrate past the high-surface-area cathode, into the underlying sulphide material.

Patent publication WO-98/42457 (Shelp et al, October 1998) shows a system in which an electrochemical cell is utilised, for the purpose of alleviating AMD. When the pyrite content of the tailings is high, and the electrical conductivity of the mass of tailings is thereby also high, the cathode of the electrochemical cell can be constituted from the pyrite itself, as shown. However, if the conductivity of the mass of sulphide is low, or if a mass of pyrite is surmounted by a layer of exposed, oxidised ferrihydrite, for example (as is often the case), this system can be less practical.

U.K. patent application GB 2,202,862A (Ontario, January 1987), U.S. Pat. No. 4,678,554 (Eltac, July 1987), and U.S. Pat. No. 3,823,081 (Kettering, July 1974), are examples of prior publications in which what might be called a galvanic cell principle is utilized. Eltac employs meshes they are used to generate an electrochemical field in soil. However, Eltac does not provide an electrochemical cover over a mass of sulphide.

U.S. Pat. No. 4,561,948 (Stiller, December 85) shows a small scale system for treating acidity, in which what might be called a galvanic cell principle is utilized to treat acidity. While such a system might be acceptable for, say, protecting the water drawn off from a well, it might be uneconomic for use on a large body of water. The cost of providing a large enough vessel in which to carry out the treatment, alone could be prohibitive. It may be noted that the Stiller system is concerned with the treatment of water that already contains a high concentration of acid.

In U.S. Pat. No. 3,823,081 (Kettering, July 1974), also, what might be called a galvanic cell principle is used to treat acidity. The system relies upon pre-treatment of mine water before the water is pumped into an electrolytic cell contained within an artificial medium such as glass, plastic, or cement.

U.S. Pat. No. 4,990,031 (Blowes, February 1991) shows a treatment system in which a cover is placed over a mass of pyrite sulphide mine tailings, to prevent oxygen from reaching the pyrite. However, this cover, though reactive, does not involve electrolytic cell action.

Treatment systems of the kind as described herein may also be suitable for treating an already-contaminated pond of water, while the water remains in the pond—unlike Stiller, or Kittering, where the water is taken out of the pond for treatment. The invention, however, is aimed more at preventing the acidity-producing reactions from taking place at all, by preventing oxygen from reaching the mass of sulphide.

DETAILED DESCRIPTION OF PREFERRED EMBODIMENTS

The invention will now be further described by referring to exemplary embodiments of the invention, as shown in the accompanying drawings. In the drawings:

FIG. 5b is a close-up of a portion of the cross-section of FIG. 5a.

The apparatus shown in the accompanying drawings and described below is an example which embodies the invention. It should be noted that the scope of the invention is defined by the accompanying claims, and not necessarily by specific features of exemplary embodiments.

Figure 1:
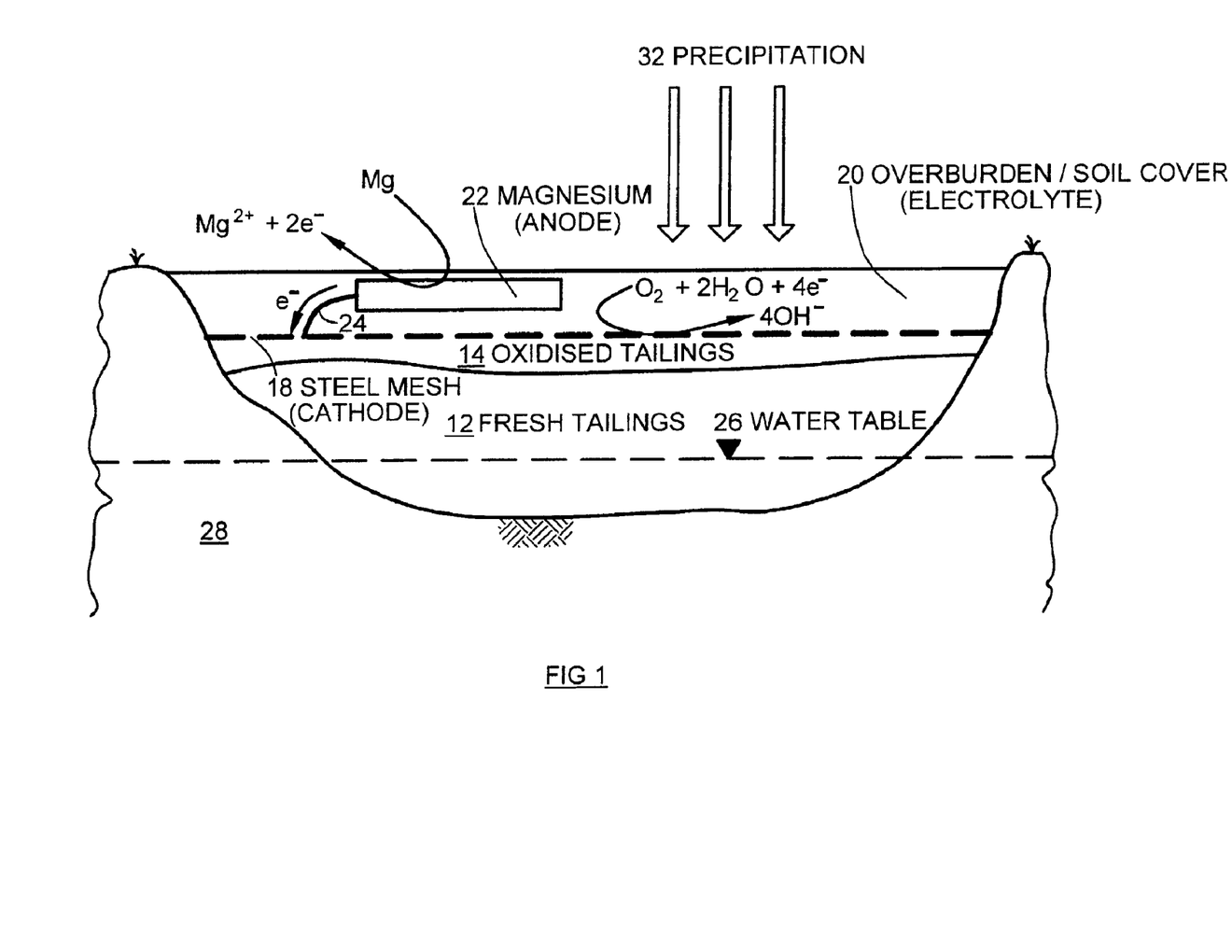
FIG. 1 is a (diagrammatic) cross-section of a sulphide tailings deposit situated within a naturally occurring basin and where there is no free standing water above the tailings.

In FIG. 1, un-oxidized (fresh) tailings 12 are shown overlain by a layer 14 of oxidized tailings. The layer 14 may be of sediment comprised of clay, silt, till, or desulphurized tailings.

The cathode material 18 is placed on top of the layer 14. A layer 20 of sediment (which will contain the electrolyte) is placed over the cathode 18. A block of magnesium 22, being the anode, is placed within the electrolyte layer 20.

An electrically conducting cable 24 connects the cathode 18 and the anode 22. The cable 24 may be made of steel, on cost grounds, although steel is rather unsatisfactory as an electrical conductor, from which standpoint aluminum or copper are preferred.

The water table in the tailings 12 and in the surrounding ground 28 is shown at 26. The water table rises and falls with the seasons, and for other reasons.

The cathode 18, the anode 22, and the associated layer 20 of clay, silt, etc, comprise an engineered electrochemical barrier. The engineered barrier serves as a physical cover, which protects the tailings from direct exposure to the atmosphere; since the barrier is in the form of an electrolytic cell, it also protects the mass of tailings 12 from exposure to oxygenated water, by de-oxygenating precipitation water 32 before the water enters the mass of tailings.

The anode 22 comprises several blocks of magnesium, spaced over the electrolytic layer 20. The blocks are wired together for electrical contact, whereby all the anode blocks are at substantially the same electrical potential. The blocks may be welded together, or wired together, in such a manner as will ensure their permanent electrical continuity.

The electrolytic layer 20 is of such a resistivity to enable the transfer of ions freely, to ensure good electrolytic contact between anode and cathode and to minimize power consumption. Ideally, the cathode should be of such design as to ensure complete coverage of the tailings. That is to say: water should not be able to by-pass the cathode, i.e substantially all water that enters the mass of tailings is water that has been de-oxygenated by passing through the cathode. The anode 22 is of such form as to optimize current distribution; the designer should provide the anode, not as a few large blocks, but as many smaller blocks, well distributed over the whole barrier.

Preferably, all the anodes should be connected together. However, for the purpose of evaluating the effectiveness of the electro-chemical barrier, one or more isolated cells may be included in the barrier, within specified areas. By periodically measuring the current in the isolated cell, an engineer can determine the oxygen flux through the barrier within the area of influence of that cell.

The cable 24 is secured, in electrical conducting fashion, to the cathode 18 and the anode 22. An electrical cell is therefore established between the electrodes 18,22, current flowing one way through the cable 24, and returning through the electrolyte in the layer 20. In the case of a galvanic cell, the anode 22 is electro-chemically more active than the cathode 18, creating a potential difference, which causes electrons naturally to flow from the anode to the cathode.

At the cathode, oxygen gas in the water is reduced to hydroxyl ions. This creates alkalinity, and results in a substantial increase in pH. Furthermore, hydrogen ions and other cations and water molecules migrate, through the electrolyte, towards the cathode. At the cathode, hydrogen ions are turned into gaseous hydrogen, or interact with oxygen to form water. As hydrogen ions are used up at the cathode in this way, a substantial raising of the pH of the electrolyte gradually takes place.

Preferably, as shown, the cathode 18 is located at the bottom of the electrolytic layer. Water tends to flow down more quickly through the upper regions of the layer, and then to settle more slowly in the lower regions, around the cathode. The electrolytic layer does not have to be totally saturated throughout with water in order to maintain electrolytic continuity between the anode and the cathode, but of course the layer tends to be more saturated in the lower than in the upper regions. To maximize the effectiveness of the cathode, in its function of reducing dissolved oxygen to hydroxyl ions, the cathode is placed where the electrolyte is most saturated.

The electrolyte layer 20, being of clay, silt, etc, acts to soak up water and retain water within itself by capillary action, and the designer should engineer the barrier such that the electrolytic layer 20 will not dry out normal during periods between falls of rain. However, if there should be a prolonged drought, the layer might dry out, to the extent that there is no longer electrolytic continuity between the anode and the cathode. This does not matter actually during the drought, when of course there is no water infiltrating into the tailings. But sudden heavy rain, falling onto a dried-out electrolytic layer, might lead to water passing through into the tailings before the electrolytic cell can become re-established, whereby the infiltrating water would not have been de-oxygenated. If this happens only very occasionally, the overall effect on acid drainage is small. However, the designer of the system should aim to minimise the number of occasions in which the electrolytic layer dries out. The capillary properties of the layer, and the thickness of the layer, are important in this regard.

The designer should also take steps to prevent damage to the cell, and unwanted infiltration of oxygenated water into the sulphide mass, due to flooding. Another point is that, if the water in the cell should freeze, electrolytic activity will cease, and the designer should ensure that the cell resumes activity smoothly when the water melts, bearing in mind that this is a time when flooding tends to occur.

The anode is a conductor that is electro-chemically more active than the cathode, and, since the metal of the anode will gradually dissolve, the dissolved metal should be environmentally-friendly. Magnesium is preferred for the anode for these reasons. At the anode, the magnesium, being the source of the electrons flowing along the cable 24, oxidizes and dissolves into the electrolyte, forming magnesium ions, $Mg++$. If the pH of the water remains below about pH-9, the magnesium will remain dissolved in the water as it passes through the layer 20 and into, and eventually through, the tailings. Should the pH of the electrolyte pore water exceed pH-9, the magnesium ions produced by the oxidation of the anodic material will begin to precipitate, as a gelatinous hydroxy-carbonate compound. The magnesium of the anode becomes depleted, in a sacrificial-anode type of electrolytic reaction.

It should be understood that a more or less optimal electrical energy flux is automatically maintained in the cell. If the infiltrating water is rich in dissolved oxygen, the electrolytic reactions drive the voltage of the cell upwards, which increases the rate of production of hydrogen at the cathode, and the rate of reduction of oxygen at the cathode, and consequently to a more rapid rate of de-oxygenation of the water infiltrating into the underlying sulphide. The alkalinity passing into the tailings mass serves to flush whatever acidity might be present in the porewater of the tailings mass, although the level of acidity in the tailings porewater does not affect the rate at which the electrolytic reactions take place in the cell.

It has been described that the electro-chemical cell treatment system acts to prevent the breakdown of acid-generating minerals by preventing oxygen from entering the sulphide wastes or sulphide bedrock. Alkalinity, the by-product of the cathodic reactions, seeps into the underlying sulphide wastes, flushing out and reacting with the acidic porewater and leading to the formation of secondary products such as iron hydroxide minerals. These minerals in many cases will precipitate on the surface of the acid-generating minerals, and in cracks and voids. When this happens, the precipitates act as a filler or sealer material. This results in a diminished permeability to oxygen diffusion and infiltrating oxygenated waters, which in turn inhibits the acid-generating characteristics of the system.

It will be understood that, when such sealing of a mass of tailings happens, due to the precipitation of these iron hydroxides, the mass becomes much less of a threat, because new precipitation water then tends to by-pass the mass, and to enter the groundwater (and streams and ponds, etc) by other routes. Also, because the oxygen supply to the now-sealed mass is inhibited, such water as does pass through the mass can be expected to pick up correspondingly little acidity. The action of the iron hydroxide precipitates in sealing up the cracks can be especially beneficial when the sulphide is in rocks, and has become exposed due to cracks occurring in the rocks. It will also be understood that if, in future decades, the electrolytic layer should, for some reason, fail structurally, or be washed away, the sealing of the sulphide mass that has already taken place can render the now-re-exposed sulphide mass less infiltrate-able.

The various effects that may be expected to take place when the electro-chemical cover system as described herein is used, may be summarized as:

(1) the acid generating reactions are inhibited from occurring;

(2) oxygen is reduced at the cathode to produce alkalinity;

(3) hydrogen is reduced at the cathode to hydrogen gas (and it will be appreciated that as the hydrogen gas diffuses upwards, it further inhibits the ingress of oxygen by displacing oxygen occupying the pore spaces within the electrolyte);

(4) the precipitates that form in the sulphide wastes as a result of the downward migration of alkalinity from the cathode region of the electrochemical cover into the underlying sulphide wastes serve to physically seal the sulphide minerals against future oxidation.

The electro-chemical cell treatment system based on the electrochemical barrier, or cover, as described, is relatively simple to service and maintain over the long term, with minimal costs. This is especially true when the cell can be engineered to operate galvanically, but even when the cell is operated in an impressed-current mode, service and maintenance are undemanding.

The electrochemical cover system has been described as it relates to mining activities and waste materials. But, as mentioned, other kinds of activity can give rise to acidity in groundwater. For example, it is known that the mere movement of heavy machinery over sulphide-rich shale can cause the shale to crack, allowing acid-causing minerals to leach out or to become exposed; thereafter, precipitation passing through the exposed minerals picks up acidity. An electrochemical barrier as described herein can be used to de-oxygenate water infiltrating into the exposed cracks.

Under normal operating conditions the anodes are wired or welded together. Since the magnesium anode is sacrificial, and gradually used up, the quantity or amount of the sacrificial anode should be large enough to maintain the operation of the cell over a long period. A galvanic potential of 1 to 2 Volts will result. The cable 24 should be of such dimensions and materials as not to cause any significant voltage losses, and the material should not be corrosive.

Figure 2:
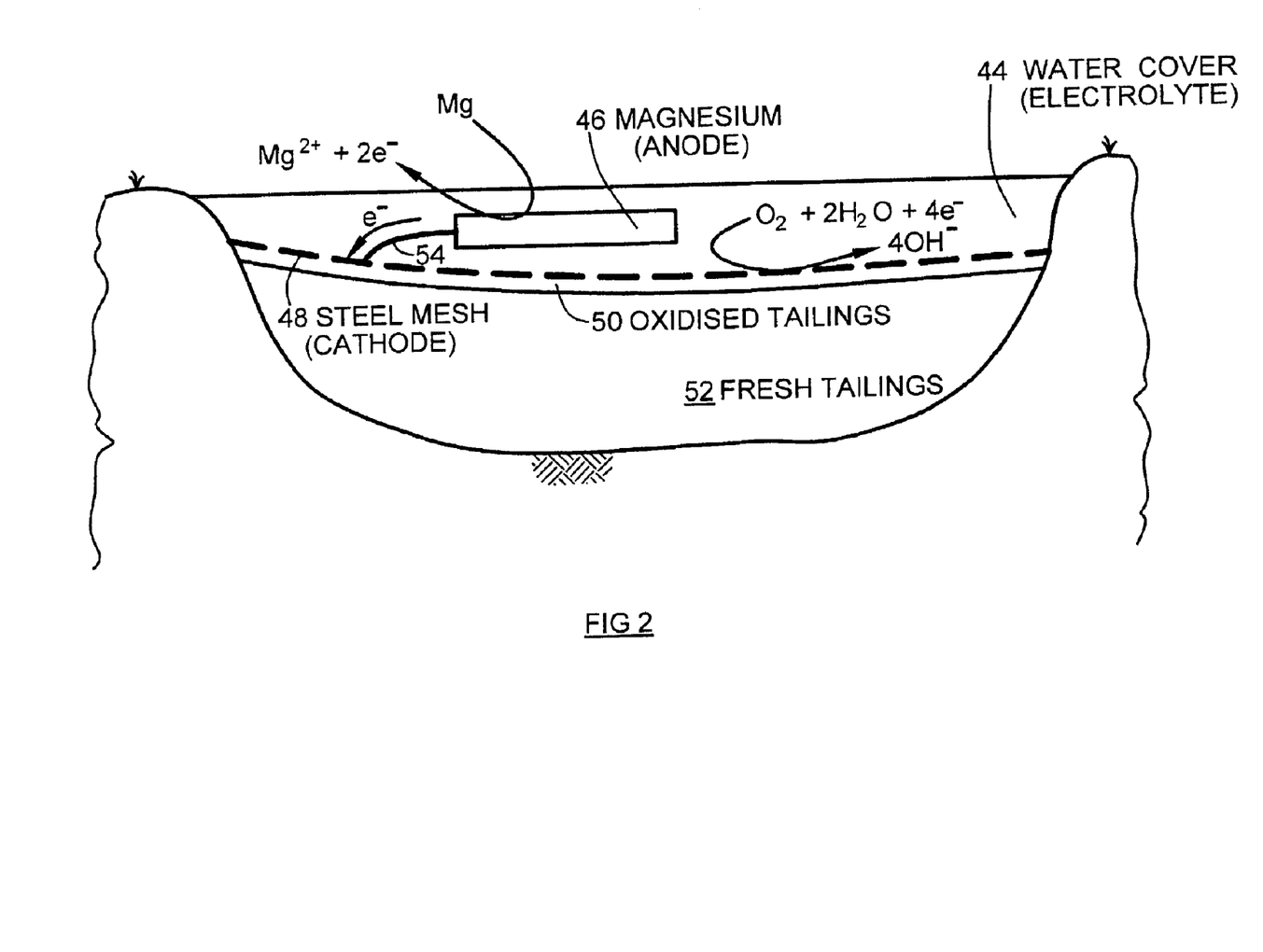
FIG. 2 is a (diagrammatic) cross-section of a sulphide tailings deposit situated within a naturally occurring basin pond of water that has free standing water above the tailings surface.

FIG. 2 shows a modification of the invention, in which the electrolyte layer covering the mass of sulphide comprises a layer of water 44. This may be contrasted with the system depicted in FIG. 1, in which the electrolyte layer comprised the fine-grained sediment 20. Of course, a very deep layer of water provides an excellent barrier for preventing ingress of oxygen into sulphide underneath the deep water, and if the mass of sulphide could be placed under very deep water (i.e several meters deep), there would be little need for the invention. The FIG. 2 system should be considered in cases where a depth of water can be provided over the mass of tailings, but where the depth of the water that can be provided is, in itself, too shallow; that is to say, where the water is so shallow that the amount of oxygen reaching the underlying un-oxidized sulphide creates an unacceptable level of oxidation of the contained sulphide minerals and consequently an unacceptable level of production of acidity.

In FIG. 2, the (magnesium) anode 46 is suspended in the water electrolyte and the (steel) wire mesh cathode 48 is placed at the bottom of the pond immediately overlying the oxidized tailings 50. If there is no oxidized tailings layer 50, the cathode 48 is placed immediately overlying the un-oxidized tailings 52. An electrically conducting cable 54 connects the cathode and anode 22.

Figure 3:
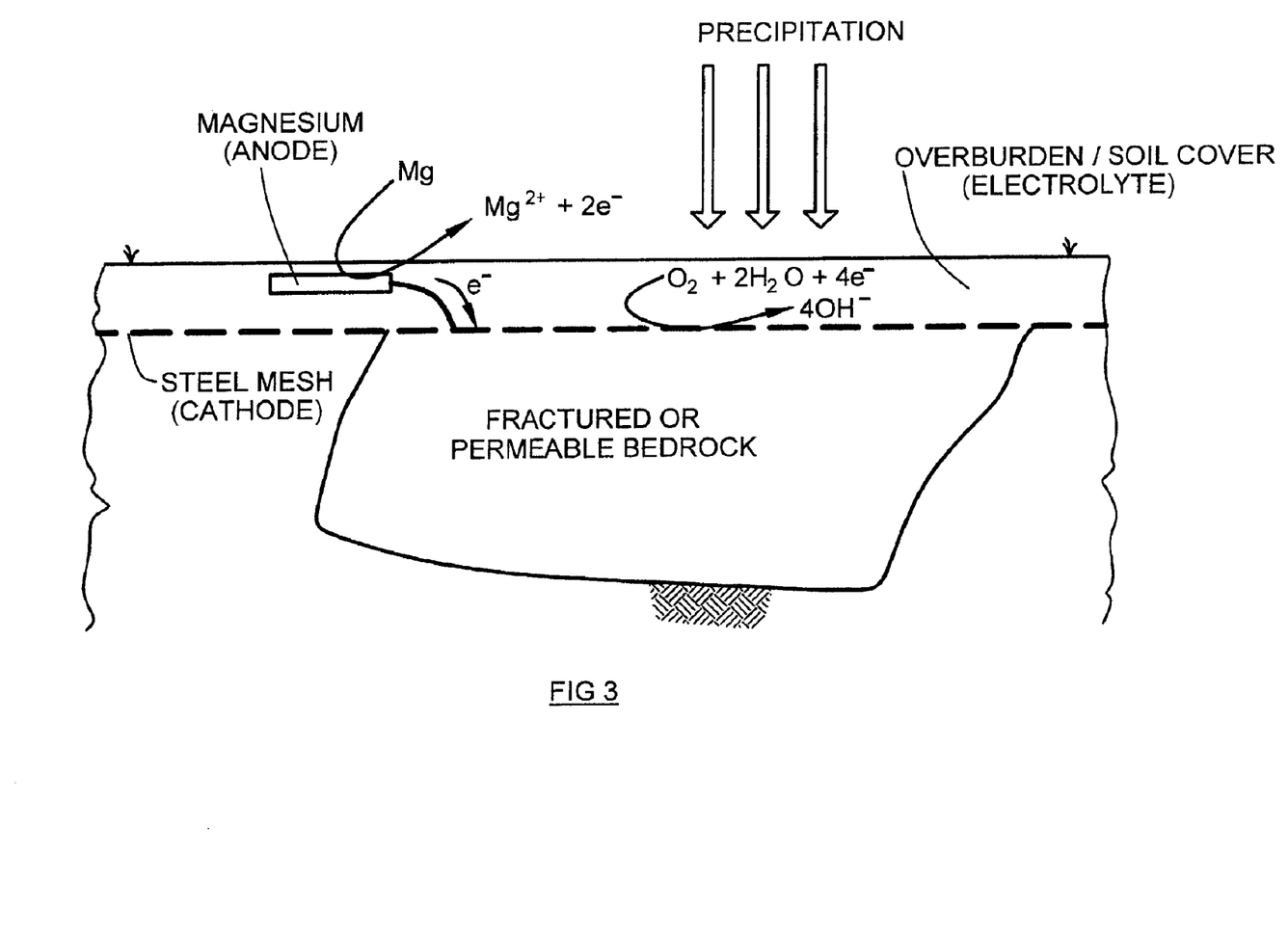
FIG. 3 is a (diagrammatic) cross-section of exposed sulphide bedrock.

FIG. 3 shows another modification of the invention, in which the electrochemical cover is placed over fractured/permeable sulphide bedrock which is the source of acidity. (In fact, in most of the situations where the electrochemical barrier is depicted as being placed over a mass of sulphide tailings, the same barrier could be placed over a mass of fractured/permeable sulphide bedrock.)

Figure 4:
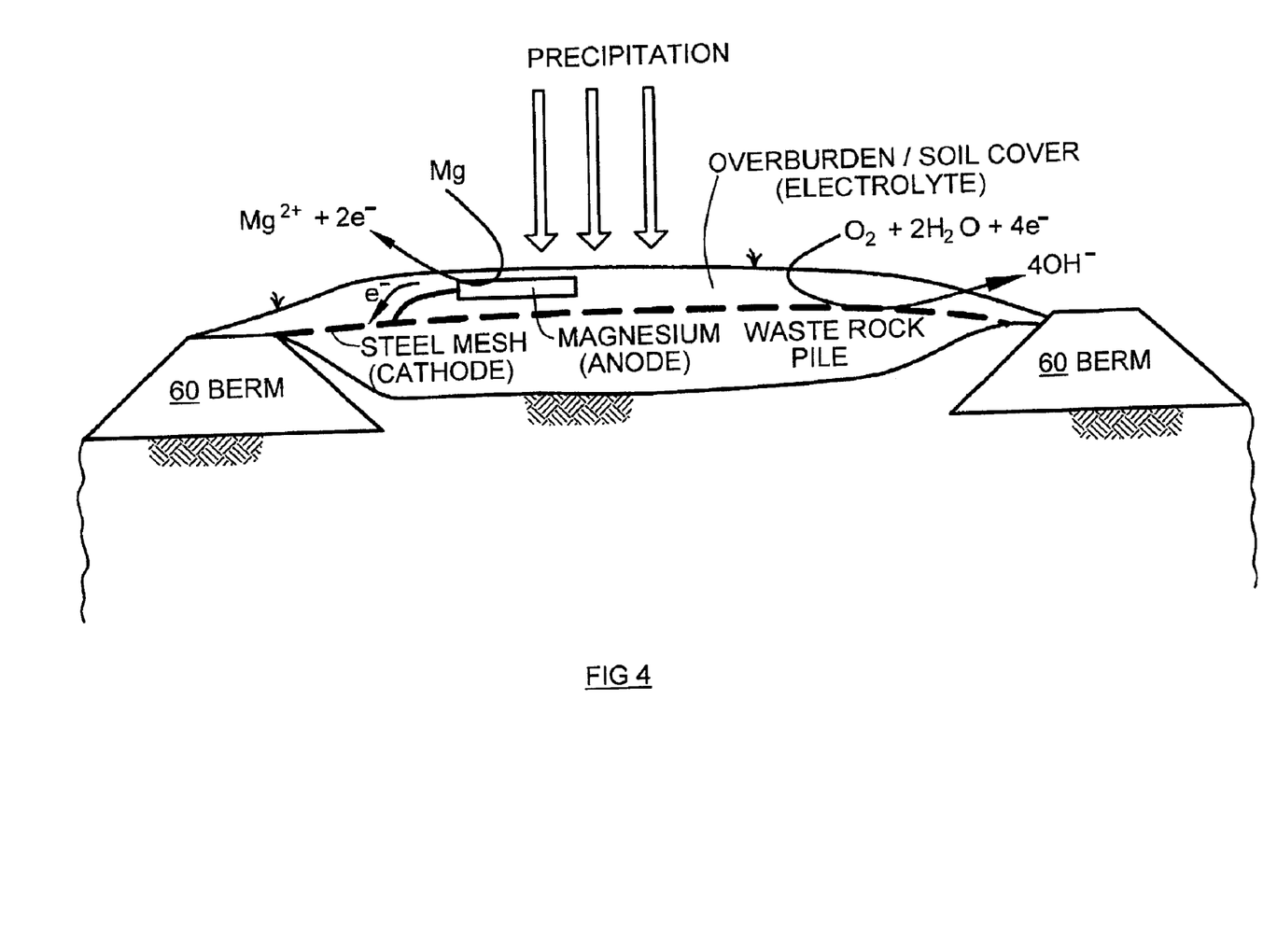
FIG. 4 is a (diagrammatic) cross-section of an elevated sulphide tailings deposit or a typical sulphide waste rock pile.

FIG. 4 shows another modification of the invention in which the electrochemical cover is placed over a mass of sulphide tailings. In this case, despite the presence of the engineered dams or berms 60, the mass may be classed as a "raised stack", and as such might have a greater tendency to be more permeable to oxygenated water and oxygen diffusion. Such raised deposits represent a greater acidity hazard, as they are even more liable to oxygen infiltration.

Again, as shown in FIG. 4, the electrolytic cell system, engineered to form a barrier or cover, can be applied to the raised mass. When the mass is raised, or perched, the designer may have to pay attention to the possible difficulties of engineering the cell so that electrical and electrolytic continuity can be maintained between anode and cathode. In each case, whether the mass of sulphide is perched, or at ground level, or in a depression in the ground, the designer must see to it that the structure of the engineered cell, as to its thickness, accommodation to slopes, etc, is physically adequate for the situation, and especially must ensure that the electrolyte-layer will not be washed away, or otherwise disturbed. One way of enhancing the structural coherence of the electrolyte layer, when the layer is of particulate material, is to establish plants and vegetation thereon.

In addition to its function as a component of the electrolytic cell, the electrolyte layer provides a physical cover for the mass of sulphide, for inhibiting the physical penetration of oxygen down into mass. This downward penetration can be derived from oxygen gas from the atmosphere, or from oxygen dissolved in the water, or from the infiltration of substances in an oxidation state that can transform readily to a reduced state.

Theoretically, what is needed to prevent a mass of sulphide from generating acidity in water passing through it is a cover that keeps oxygen from penetrating into the sulphide. If the sulphide lies underneath several meters of water, for example, oxygen can be effectively excluded. If the sulphide lies underneath (even more) meters of soil or the like, again oxygen can be effectively excluded. However, providing a simple cover, which is thick enough, over the large area of a tailings mass, can be prohibitively expensive.

The cost can be very large of building a dam around a mass of dumped tailings, to provide a deep enough layer of water. The cost of a bringing in a thick enough layer of soil is hardly less. But, if the lie of the land is favourable, as it sometimes is, an effectively-deep cover can be provided inexpensively enough, and in that case of course that can be done.

But there are in existence many masses of sulphide tailings, where a full-thickness cover is out of the question on cost grounds, but where a thinner cover might be feasible. It is an aim of the present invention to enable adequate oxygen exclusion by the use of a thin cover.

In the invention, as described, the cover, i.e the electrolyte layer, may be of water, or of soil. The actual thickness dimension of a granular-solid electrolyte layer, to be adequate for use in the invention, depends on the type of soil or other material being used to provide the layer, on the expected level of precipitation and the possibility for droughts, and so on. In a typical case, where the layer is of clay or fine silt, which retains water for long periods, it is possible that an effective electrolyte layer may be no more than 30 cm thick. Where the layer is of coarser till or sand, to be effective the layer should be 100 cm thick or more. If the electrolyte cover is of water, the minimum depth of the water should be not less than 30 cm. These thicknesses should be contrasted with the corresponding needed thicknesses of the same materials which are required, as mentioned, when the cover is a purely physical one.

Figure 5A:
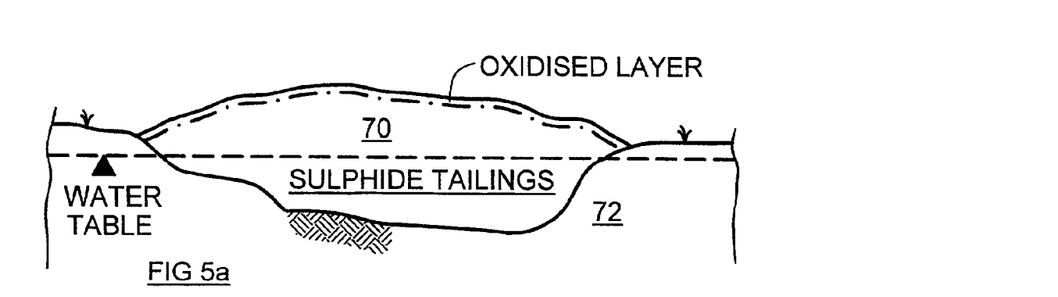
FIG. 5a is a (diagrammatic) cross-section of an elevated sulphide tailings deposit, in which precautions have been taken to deoxygenated water entering from the sides.
Figure 5B:
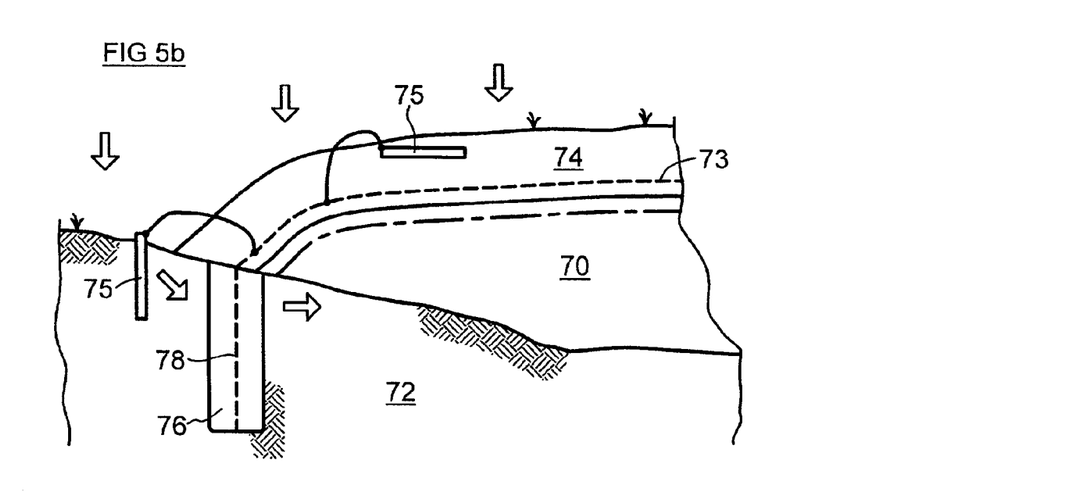

FIG. 5a shows a mass 70 of sulphide tailings, in which the mass is so placed, in relation to the ground 72, as to be vulnerable to infiltration of oxygen-laden water into the pile laterally, i.e from the sides. FIG. 5b shows how the electrochemical barrier apparatus can be engineered so as to protect the mass from the side-infiltrating water.

In FIG. 5b, a steel-mesh cathode 73 has been placed over the mass 70. A covering layer 74 of soil (clay, silt, sand, etc, as previously described) is placed over the cathode 73. The layer 74 holds enough moisture that the layer can serve as the electrolytic layer, in the manner as described. A magnesium anode 75 is provided, and the resulting electrolytic cell operates galvanically, as described.

In the FIG. 5b case, however, a trench 76 has been provided in the ground surrounding the mass, and the steel-mesh cathode has been extended down into the trench, to form an apron-portion 78 of the cathode. The trench has been back-filled with a granular conductive material, such as graphite. This ensures that the water, as it passes through the cathode, remains in electrolytic contact with the cathode for an adequate residence time.

Unless it can be determined that, at a particular sector of the mass 70, inwards-infiltration is precluded by, for example, the lie of the land, whereby an apron would not be needed at that sector, the apron-portion 78 should be provided all around the perched mass. It might well happen that, in some places, or at some times, water will pass outwards from the tailings mass, i.e outwards through the apron-portion of the cathode. Assuming the electrolytic treatment cell has performed its task, such water will be already de-oxygenated, and will contain little or no acidity; if the Eh-voltage level of such water should undergo a further fall, in passing through the apron, that would not pose a problem.

In suitable cases, the barrier may be made more effective by the inclusion of a second electrolytic cell, so placed that the oxygenated water infiltrates down in series through two cells, and two cathodes. This can be useful, for example, in a case where the electrolyte layer has been damaged, or is too thin.

The systematic placement of the cell at the tailings or waste rock surface during the construction of conventional engineered covers would provide a direct non-invasive method of measuring the effectiveness of the said engineered cover.

The electrolytic cell systems as described herein are aimed at preventing the oxidation of sulphide minerals and the associated production of acidity. The engineered cell serves as a cover, to physically inhibit atmospheric oxygen from penetrating downwards into the mass of sulphide; the cell also operates electro-chemically, to de-oxygenate the water reaching the mass of tailings. The engineered cell systems can be relatively inexpensive to construct, even in respect of a tailings heap that has lain totally abandoned for years, and can be satisfactory from the standpoint of maintenance, in that the procedure can be made to function, if desired, substantially without any regularly scheduled maintenance at all.

Preferably, the electrochemical barrier apparatus, or cover, should be insulated from the sulphide mass. In the case where the uppermost layer of sulphide has become oxidised, the oxidised layer can serve as the insulation. If there is no already-oxidised layer, or if it is desired to supplement the oxidised layer, a layer of sand or other insulative material can be introduced, and placed on top of the sulphide-mass, and then the electrochemical cover is put in place over the layer of sand.

The electrochemical cover may be regarded as functionally and structurally separate from the sulphide mass. This may be contrasted with the prior art technique, in which the cathode has been formed actually by the sulphide-mass. However, this technique required that the sulphide-mass not only be highly conductive, but that it be so homogeneously over the whole body of sulphide. Thus, the technique had limited applicability. The present engineered electrochemical barrier is useful even when the sulphide-mass is not especially conductive or homogenous.

In the context of the present invention, the sulphide-mass is oxygen sensitive in the sense that the redox state of the sulphide is such that exposure to oxygen-containing water makes the sulphide liable to oxidise, leading to the acidity-producing reactions as described above.

What is claimed is:

1. Electro-chemical barrier-apparatus, for de-oxygenating water infiltrating into a sulphide-mass, in combination with the sulphide-mass, being a mass of material which includes, as a substantial component thereof, an oxygen-sensitive sulphide mineral, wherein:

the arrangement of the combination is such that the electro-chemical barrier-apparatus intercepts oxygenated water moving towards the sulphide-mass;

the barrier-apparatus includes an electro-chemical cell, comprising an anode, a cathode, and electrolyte;

the barrier-apparatus includes an electrical circuit, which is effective to ensure that electrical energy passes between the anode and the cathode;

the electrolyte comprises water infiltrating through the cell, and the barrier-apparatus includes a support container, which is so structured and arranged as to contain and support the water as it infiltrates through the cell, in such manner that the infiltrating water lies in electrolytic continuity between the anode and the cathode as it infiltrates through the cell;

the support container is of such nature as to be substantially inert with respect to electrolytic reactions taking place in the cell;

the combination is so structured and arranged that water infiltrating into the sulphide-mass is water that has first passed through, and emerged from, the cathode;

the cathode comprises a matrix of elements;

the elements of the cathode are of electrically conductive material;

the matrix of elements of the cathode are so arranged as to create passageways, through which water can pass through the cathode;

the barrier-apparatus is so structured as to ensure that water, in passing through the cathode, remains in substantial electrolytic contact with the cathode for a substantial residence time;

the anode and the cathode are so structured, and are so arranged in the cell, as to lie separated and spaced apart;

the combination includes an electrically-conductive cable, which connects the anode and the cathode;

the anode and the cathode are so structured, and are so arranged in the cell, as to provide such current distribution between the anode and the cathode as will ensure that the electrolytic contact and the residence time of water passing through the passageways in the cathode are substantial enough that water emerging from the cathode has an Eh-voltage of less than 0.3 volts;

the arrangement of the combination is such as to ensure that the Eh-voltage of the water, after the water has passed through, and emerged from, the cathode, and before infiltrating into the sulphide-mass, remains below 0.3 volts.

2. Combination of claim 1, wherein:

the sulphide-mass has substantial permeability, whereby water entering the sulphide-mass can infiltrate through the sulphide-mass, and the arrangement of the combination is such as to ensure that the Eh-voltage of the water, in infiltrating through the sulphide-mass, remains below 0.3 volts;

the arrangement of the combination is such that substantially all water that enters the sulphide-mass is water that has passed through the cathode, and has an Eh-voltage below 0.3 volts.

3. Combination of claim 1, wherein the arrangement of the combination is such that substantially all water infiltrating into the sulphide-mass, prior to infiltrating into the sulphide-mass, is water that has passed through the barrier-apparatus, and has comprised the electrolyte of the electrochemical cell.

4. Combination of claim 1, wherein the barrier-apparatus is in the form of a roof or cover, which is so structured and arranged:

as to overlie the sulphide-mass, and to intercept precipitation water, and thereby to protect the sulphide-mass from direct exposure to precipitation water;

that precipitation water passes by gravity down through the cover, through the cathode, and then infiltrates by gravity down into the sulphide-mass;

as to protect the sulphide-mass from exposure to atmospheric oxygen;

and as to protect the cathode from exposure to atmospheric oxygen.

5. Combination of claim 1, wherein the arrangement of the cell is such that the anode lies upstream of the cathode, being upstream with respect to water passing through the cathode.

6. Combination of claim 1, wherein the cathode is so structured and arranged that the elements of the cathode lie connected together electrically in such manner as to ensure the elements lie all at substantially the same voltage.

7. Combination of claim 1, wherein:

the support container comprises a body of water-retaining material, being material that is capable of preventing water from draining out of the body, by capillary action;

and the anode and the cathode lie embedded in the body of water-retaining material.

8. Combination of claim 7, wherein the water-retaining material is substantially inert with respect to electrolytic reactions taking place in the cell.

9. Combination of claim 1, wherein the support container comprises a basin, of such structure as to retain water therein at a sufficient depth that the anode and the cathode remain immersed therein.

10. Combination of claim 1, wherein:

the electrical circuit comprises a means for promoting galvanic action between the anode and the cathode;

the anode is made from a sacrificial material, being material that can be transformed by electrolytic reaction to a state in which ions of the material pass into solution in the electrolyte.

11. Combination of claim 1, wherein:

the electrical circuit comprises a source outside the cell for impressing outside electrical energy into the cell;

both the anode and the cathode are made from material that remains substantially inert with respect to the electrolytic reactions of the cell.

12. Combination of claim 11, wherein:

the combination includes an Eh-voltage measuring means, for measuring the Eh-voltage of water emerging from the cathode;

the source includes an operable controller for controlling the rate at which electrical energy is impressed into the cell, and the said operable controller is operable responsively to the Eh-voltage measuring means;

and the said operable controller is operable automatically to increase and decrease the said rate in correspondence with rises and falls in the measured Eh-voltage.

13. Combination of claim 11, wherein:

the matrix of elements comprises a permeable cathode-body of grains of an electrically-conductive material, such as graphite, and the passageways comprise pores between the grains;

the whole of the cathode-body of grains is electrically coherent, in that substantial differences in voltage cannot exist within the cathode-body, the cathode-body of grains of electrically-conductive material lies spread out as a thick layer over substantially the whole sulphide-mass.

14. Combination of claim 1, wherein:

the matrix of elements comprises a metal cathode-mesh, and the passageways comprise holes in the cathode-mesh;

the holes in the cathode-mesh are small enough that all water passing through the cathode passes close enough to the metal of the cathode-mesh as to be electrolytically-influenced thereby;

the holes in the cathode-mesh are so sized and shaped that all water passing through the holes comes within 2 cm of the metal of the cathode-mesh.

15. Combination of claim 1, wherein:
the water in passing through the combination has a lateral component of velocity;
the arrangement of the combination is such as to ensure that substantially all oxygenated water moving towards the mass of oxygen-sensitive material, and having the lateral component of velocity, is intercepted and de-oxygenated by the electro-chemical barrier apparatus before reaching the mass.

16. Combination of claim 1, wherein:
the support container comprises a body of water-retaining material;
a cover-portion of the anode and a cover-portion of the cathode lie embedded in the body;
the sulphide-mass lies on or in the ground, and the body of water-retaining material lies perched on top of the sulphide-mass;
the sulphide-mass has side-surfaces through which water can enter the sulphide-mass, from a direction other than downwards;
an apron-portion of the cathode extends down into the ground near the side-surfaces of the sulphide-mass;
the apron-portion of the cathode includes means for connecting the elements of the apron-portion electrically together, end to the cover-portion of the cathode, in such manner as to ensure that all the elements of the cathode lie at substantially the same voltage;
the apron-portion of the cathode extends sufficiently far down into the ground that water entering the sulphide-mass laterally through the side-surfaces is intercepted and de-oxygenated by the apron-portion of the cathode.

17. Combination of claim 1, wherein the sulphide-mass comprises an on-ground pile of tailings from an ore-crushing operation.

18. Combination of claim 1, wherein the sulphide-mass comprises an in-ground seam of sulphide mineral, which has become exposed.

19. Combination of claim 1, wherein at least a substantial portion of the material comprising the sulphide-mass is substantially not electronically conductive.

20. Electro-chemical barrier-apparatus, for de-oxygenating water infiltrating into a sulphide-mass, in combination with the sulphide-mass, being a mass of material which includes, as a substantial component thereof, an oxygen-sensitive sulphide mineral, wherein:
the arrangement of the combination is such that the electro-chemical barrier-apparatus intercepts oxygenated water moving towards the sulphide-mass;
the barrier-apparatus includes an electro-chemical cell, comprising an anode, a cathode, and electrolyte;
the barrier-apparatus includes an electrical circuit, which is effective to ensure that electrical energy passes between the anode and the cathode:
the electrolyte comprises water infiltrating through the cell, and the barrier-apparatus includes a support container, which is so structured and arranged as to contain and support the water as it infiltrates through the cell, in such manner that the infiltrating water lies in electrolytic continuity between the anode and the cathode as it infiltrates through the cell;
the support container is of such nature as to be substantially inert with respect to electrolytic reactions taking place in the cell;
the combination is so structured and arranged that water infiltrating into the sulphide-mass is water that has first passed through, and emerged from, the cathode;
the cathode comprises a matrix of elements:
the elements of the cathode are of electrically conductive material;
the matrix of elements of the cathode are so arranged as to create passageways, through which water can pass through the cathode;
the barrier-apparatus is so structured as to ensure that water, in passing through the cathode, remains in substantial electrolytic contact with the cathode for a substantial residence time;
the anode and the cathode are so structured, and are so arranged in the cell, as to provide such current distribution between the anode and the cathode as will ensure that the electrolytic contact and the residence time of water passing through the passageways in the cathode are substantial enough that water emerging from the cathode has an Eh-voltage of less than 0.3 volts;
the arrangement of the combination is such as to ensure that the Eh-voltage of the water, after the water has passed through, end emerged from, the cathode, and before infiltrating into the sulphide-mass, remains below 0.3 volts;
an electrically non-conductive layer lies between the cathode and the sulphide-mass;
whereby the cathode is physically isolated from, and electrically insulated from, the sulphide-mass by the said layer.

21. Combination of claim 20, wherein:
the sulphide-mass, being a mass of material which includes, as a substantial component thereof, an oxygen-sensitive sulphide mineral, lies underneath a layer that consists of or includes the material in an already-oxidised form;
the cathode is physically isolated from, and electrically insulated from, the sulphide-mass by the already-oxidised layer.

22. Combination of claim 20, wherein the electrically non-conductive layer comprises a layer of non-conductive material that has been introduced and placed over the sulphide-mass.

* * * * *